(12) United States Patent
Suzumura et al.

(10) Patent No.: US 7,584,042 B2
(45) Date of Patent: Sep. 1, 2009

(54) VEHICLE RUNNING CONTROL DEVICE

(75) Inventors: Masato Suzumura, Susono (JP); Yoshikazu Hattori, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 490 days.

(21) Appl. No.: 11/110,926

(22) Filed: Apr. 21, 2005

(65) Prior Publication Data

US 2005/0267666 A1  Dec. 1, 2005

(30) Foreign Application Priority Data

May 13, 2004 (JP) ............................. 2004-143426

(51) Int. Cl.
*G06F 19/00* (2006.01)
*G06F 7/00* (2006.01)
*G06F 17/00* (2006.01)

(52) U.S. Cl. ............................. 701/70; 701/71; 701/72; 701/73; 701/74; 701/75; 701/53; 701/54; 701/90; 303/41; 303/45; 303/46; 303/47; 303/48; 318/580; 318/586

(58) Field of Classification Search .................. 701/48, 701/69, 41–45, 70–98; 303/138–148; 318/580, 318/586
See application file for complete search history.

(56) References Cited

U.S. PATENT DOCUMENTS 5,001,637 A * 3/1991 Shiraishi et al. ............... 701/41
5,627,756 A * 5/1997 Fukada et al. ................. 701/70
5,684,700 A * 11/1997 Crocker ....................... 701/41
5,816,669 A * 10/1998 Hiwatashi et al. ........... 303/140
6,438,474 B1 * 8/2002 Tanaka et al. ................. 701/41
6,834,543 B2 * 12/2004 Kin et al. ....................... 73/146
2003/0055547 A1 * 3/2003 Chen et al. ................... 701/48

FOREIGN PATENT DOCUMENTS

| DE | 197 51 227 A1 | 9/1998 |
| EP | 0 943 515 A1 | 9/1999 |
| JP | A-05-105055 | 4/1993 |
| JP | A-06-135345 | 5/1994 |
| JP | B2-2540742 | 7/1996 |
| JP | A 10-329746 | 12/1998 |

* cited by examiner

*Primary Examiner*—Khoi Tran
*Assistant Examiner*—Bhavesh V Amin
(74) *Attorney, Agent, or Firm*—Oliff & Berridge, PLC

(57) ABSTRACT

There is provided a new and novel vehicle running control device for correcting a yaw angle of a vehicle toward the yaw direction intended by a driver, together with vehicle stability control, through generating yaw moments. In order to accomplish the yaw angle correction, the inventive device operates a yaw moment generating apparatus e.g. a steering apparatus, so as to generate a direction correcting yaw moment based upon an integration value of the deviations between an actual yaw rate and its target value. The direction correcting yaw moment may be generated for correcting the yaw angle deviation remaining after the stability control is ended.

8 Claims, 5 Drawing Sheets

VEHICLE RUNNING CONTROL DEVICE

BACKGROUND OF THE INVENTION

1. Field of the Invention

The present invention relates to a running control device for generating a yaw moment to stabilize a running condition of a vehicle such as an automobile at least when the running condition is deteriorated, and more specifically, to such a device for controlling a steering of a vehicle, as well as its behavior stability.

2. Description of Prior Art

A running behavior of a vehicle can be stabilized through generating a yaw moment around the centroid of the vehicle. In well-known Vehicle Stability Control (VSC), the tire force distribution in a vehicle is controlled to generate a yaw moment in a direction opposite to oversteering, understeering and other undesirable yaw directional tendencies of the vehicle (a counter yaw moment), assisting a driver's steering operation for suppressing such undesirable tendencies.

Further, in a vehicle equipped with a steering system enabling the steering of wheels independently of a driver's steering operation, a yaw moment to assist the driver for suppressing running behavioral deterioration may also be generated by an automatic steering of wheels. For example, in Japanese Patent Laid-Open Publication No. 5-105055 and Japanese Patent No. 2540742, a steering angle of wheels is controlled to generate a counter yaw moment against a braking force imbalance between the left and right wheels on a vehicle, and thereby ensuring its straight line stability. Japanese Patent Laid-Open Publication No. 6-135345 proposes controlling an auxiliary steering system in a four wheel steering vehicle using proportional, differential and integral terms of the deviation of an actual yaw rate from its target value, improving the responsiveness of the auxiliary steering system against a lateral sliding of a vehicle body owing to an abrupt steering in the main steering system, crosswind disturbances, etc.

Oversteering and/or understeering tendencies and other yaw behavioral tendencies, owing to tire force saturation on front and/or rear wheels of the vehicle, tire force imbalance between left and right wheels, etc., primarily appear in a yaw rate of the vehicle. Thus, in conventional devices for stabilizing a running behavior of a vehicle, such as VSC devices, typically, a counter yaw moment is generated to reduce the deviation of an actual yaw rate from its target value, i.e. an ideal yaw rate, which can be determined based upon a theoretical motional equation using a steering angle of wheels or a handle, a vehicle speed, etc. as parameters. The adjusting of the actual yaw rate to its target value will suppress further yaw behavioral deterioration, thereby preventing spinning and/or drifting-out, unintentional turning, yaw directional oscillation of a vehicle.

The above-mentioned control strategy of adjusting a yaw rate in the conventional devices, however, could not fully correct the deviation of a yaw angle of a vehicle body from the yaw angle consistent with the traveling direction intended by a driver. In the strategy of adjusting a yaw rate, the generation of a counter yaw moment would be ended when an actual yaw rate coincides with its target value even if the direction of the vehicle body, namely, the yaw angle of the vehicle, remains inconsistent with the direction of a traveling course intended by a driver. In this regard, for a normal vehicle, maneuvered by the handling of a driver, a target yaw angle could not be determined with a control device theoretically like the target yaw rate. Since the target yaw angle is inherently to be determined by a driver's intention and the relation between a steering angle (an input of the driver's intention), and an actual traveling direction of a vehicle widely varies with the running condition of a vehicle, the driver has to adjust the yaw angle through his handling while confirming the actual traveling course of his vehicle.

In the purpose of vehicle stability control, i.e. assisting a driver's steering operation, however, it will be preferable to correct at least a tendency of a yaw angle deviating from a driver's intention. Accordingly, conventional vehicle stability and/or steering control devices may be improved to operate more appropriately while taking into account the yaw angle deviation owing to the yaw rate deviation.

SUMMARY OF INVENTION

According to the present invention, there is provided a novel vehicle running control device executing not only the stabilization of a yaw behavior of a vehicle through controlling its yaw rate, but also the correction of a yaw angle of the vehicle, thereby assisting a driver's steering operation especially when the running condition of the vehicle is being deteriorated.

In one aspect of the present invention, the inventive control device may be equipped on a vehicle for controlling its running conditions by operating an apparatus installed on the vehicle, such as a braking control system and/or a steering apparatus, to generate a yaw moment around the centroid of the vehicle body. The inventive device primarily conducts a running stability control of the vehicle through generating a stabilizing yaw moment for suppressing oversteering, understeering and/or other undesirable yaw behavioral tendencies. Thus, the device may comprise a portion of judging if a running condition of the vehicle is deteriorated and a portion of executing a running stability control of the vehicle, such as a normal VSC control through adjusting a yaw rate of the vehicle.

Secondly, as well as the stability control, the inventive device executes a control of correcting a yaw direction of the vehicle body, i.e. reducing the deviation of the yaw angle of the vehicle from the yaw direction intended by the driver. In order to accomplish the yaw angle correction, the inventive device operates a yaw moment generating apparatus as described above so as to generate a yaw moment (a direction correcting yaw moment) in the direction of reducing the deviation between an actual yaw rate and its target value based upon an integration value of the yaw rate deviations. Accordingly, the inventive device comprises a detector of detecting an actual yaw rate of the vehicle, a portion of calculating a target yaw rate for the vehicle based upon a driver's operation and a portion of calculating an integration value of differences between actual and target yaw rates.

As understood, a variation of a yaw angle of a vehicle body can be given by a time integral of a yaw rate. Thus, even though the target yaw angle could not be determined as described previously, the generation of the direction correcting yaw moment as described above will reduce the yaw angle deviation owing to the yaw rate deviation, rendering the direction of the vehicle body coincident with or close to the direction intended by the driver, i.e. suppressing the tendency of undesirable yaw angle deviation. In this regard, even when the yaw rate deviation is cancelled or reduced enough for suppressing further yaw behavioral deterioration by the stability control, there would remain the yaw angle deviation owing to the yaw rate deviation during adjusting the yaw rate under the stability control. Thus, it should be noted that, after the yaw rate deviation is substantially cancelled, the direction correcting yaw moment may be generated for correcting the remaining yaw angle deviation.

As described above, for a normal vehicle running on a normal road, a target yaw angle is difficult to determine because the traveling direction of the vehicle is inherently decided by a driver and it is difficult for a control device to estimate the driver's intention. The driver's intention is inputted from the steering angle. However, since the response of the yaw angle is second-order delayed relative to a yaw moment variation responding to the variation of the steering angle, it is possible that the resultant appearing yaw angle response is no longer consistent with the current driver's intention. That is, a variation of the yaw angle by the control based upon the integration components of past yaw rate deviations could become excessive and/or unexpected for a driver.

For avoiding such an unexpected variation of the yaw angle, firstly, the above-mentioned inventive device may be designed to conduct the integration of the yaw rate deviations when the running stability control is executed. Then, the direction correcting yaw moment will not be generated under normal running conditions, avoiding excessively frequent execution of the direction correcting control. The generation of the direction correcting yaw moment is started only when a stability control is started where the controllability of the driver for his vehicle becomes relatively low. This design, in which the periods for the integration are limited, also contributes to avoiding an excessive variation of the yaw angle.

Moreover, since the target yaw angle could not be available, it could not be judged if the resultant yaw angle variation by the control becomes sufficient and when the direction correcting control should be ended. Further, although the yaw angle intended by the driver can change anytime, time integration value, once calculated, will not decrease by itself. Thus, in order to end appropriately the generation of the direction correcting yaw moment, the inventive device may be designed to calculate a yaw rate deviation every predetermined period and to calculate the integration value while reducing weights of yaw rate deviations of the preceding periods. In this design, the weights of the yaw rate deviations of older periods may be rendered smaller. Further, practically, the integration value may be given by summing a yaw rate deviation at a present period and a value obtained by multiplying an integration value calculated in periods before the present period by a forgetting factor, which may be constant or reducing with time. The multiplication of the forgetting factor reduces the weights of the older yaw rate deviations in the resultant integration.

In this design of the integration, the contribution of each yaw rate deviation to the integration value will be reduced with time, and therefore, even when the yaw angle intended by the driver is changed, the effects of yaw rate deviations already incorporated into the integration value will be reduced, contributing to the avoidance of excessive and/or unexpected yaw angle control. After the integration process is ended when a significant yaw rate deviation is substantially cancelled, the total integration value and, in turn, the direction correcting yaw moment will be gradually reduced. This design is also preferable for preventing a vehicle behavior from being deteriorated due to an abrupt elimination of the direction correcting yaw moment.

As noted, the stability control and direction correcting control may be executed by operating either of a steering system and a braking system. For a vehicle equipped with a steering system enabling the steering of front wheels independently of a driver's steering action and so designed that a direction correcting yaw moment determined based upon the integration of yaw rate deviations is generated by operating the steering system, preferably, an increase in a direction correcting yaw moment is suppressed or the direction correcting control is not executed when the vehicle is fallen into an understeering condition. This is because the tire forces of the front wheels are almost saturated, and therefore further steering for increasing its angle would deteriorate the running behavior of the vehicle. For a vehicle equipped with a steering system enabling the steering of rear wheels independently of a driver's steering action, namely, a four wheel steering vehicle and so designed that a direction correcting yaw moment determined based upon the integration of yaw rate deviations is generated by operating the rear wheel steering system, preferably, an increase in a direction correcting yaw moment is suppressed or the direction correcting control is not executed when the vehicle is fallen into an oversteering condition because the tire forces of the rear wheels are almost saturated.

Both the stability control and direction correcting control may be executed by operating a braking control system of a vehicle (Even in a vehicle equipped with a steering system enabling the steering of wheels independently of a driver's steering action, a direction correcting control may be executed by operating the braking system.). In this case, a total target yaw moment to be generated through controlling tire force distribution will be a sum of a stabilizing yaw moment determined based upon a present yaw rate deviation and a direction correcting yaw moment determined based upon the integration of yaw rate deviations. As described above, in execution of the inventive controls, preferably, a target yaw moment will be generated mainly with wheels whose tire forces are not saturated.

Accordingly, it is an object of the present invention to provide new and novel vehicle running control devices for correcting a yaw angle of a vehicle toward the yaw direction intended by a driver, together with vehicle stability control, through generating yaw moments.

It is another object of the present invention to provide such devices operating a braking apparatus and/or a steering apparatus of a vehicle to generate a direction correcting yaw moment determined based upon an integration value of deviations or differences between actual and target yaw rates.

It is a further object of the present invention to provide such devices keep generating a yaw moment for correcting the yaw angle of the vehicle even after the yaw rate deviation has been cancelled through stability control.

It is a further object of the present invention to provide such devices for correcting a yaw angle of a vehicle without applying an excessive and/or unexpected yaw moment on the vehicle body.

It is a further object of the present invention to provide such devices for correcting a yaw angle of a vehicle, in which a direction correcting yaw moment smoothly disappears even when a target yaw angle is not available.

Other objects and advantages of the present invention will be in part apparent and in part pointed out hereinafter.

BRIEF DESCRIPTION OF THE DRAWINGS

In the accompanying drawings.

DESCRIPTION OF PREFERRED EMBODIMENTS

Figure 1:
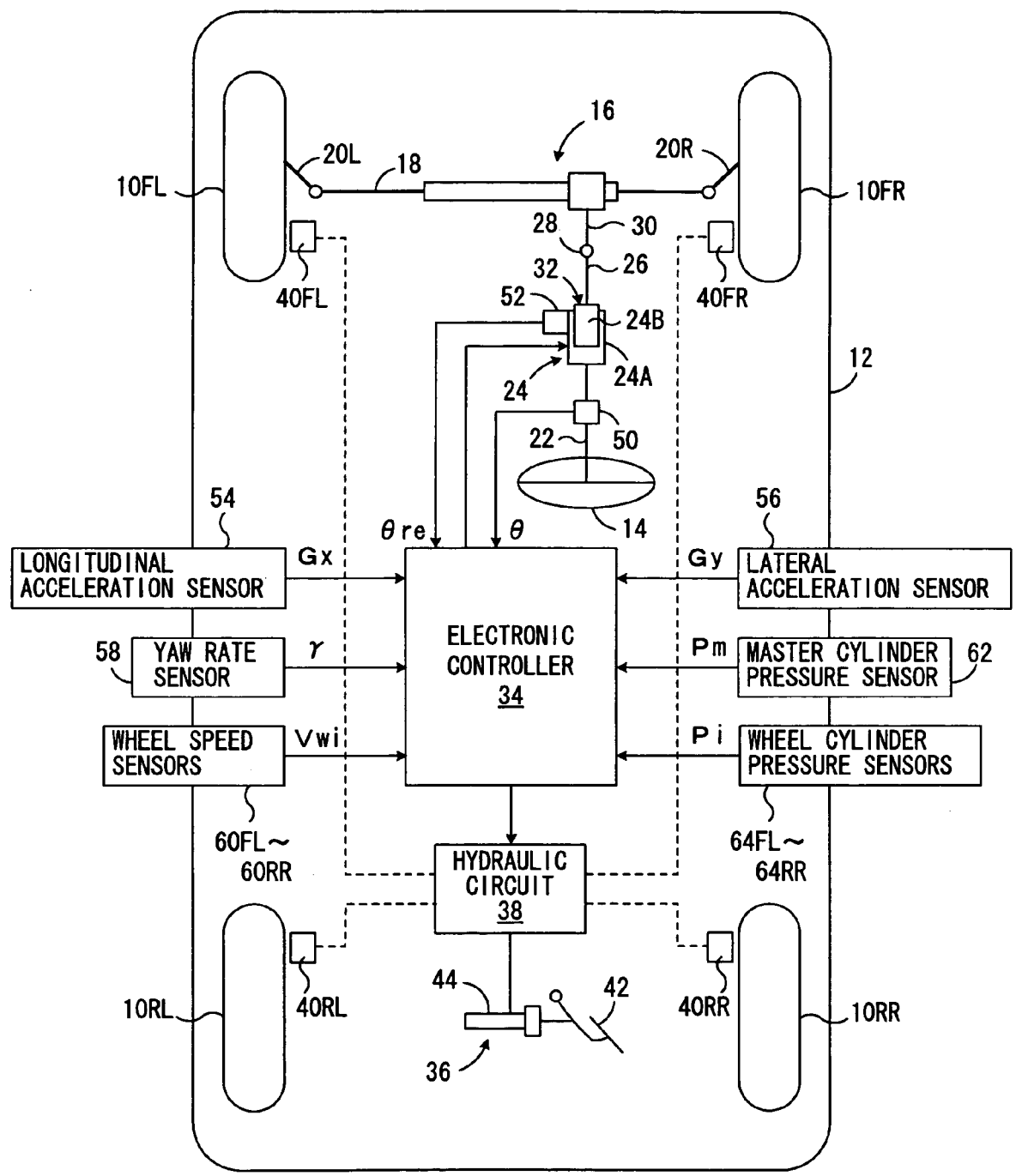
FIG. 1 is a diagrammatical view of a four wheeled, rear drive vehicle equipped with a steering apparatus for the front wheels of a semi-steer-by-wire type serving as an automatic steering apparatus and a first embodiment of a vehicle running control device according to the present invention.

FIG. 1 diagrammatically shows a four-wheeled, rear drive vehicle having a first preferred embodiment of a vehicle running control device according to the present invention. In this drawing, a vehicle body 12 has left and right front wheels 10FL and 10FR, left and right rear-wheels 10RL, 10RR. As usual, the vehicle is formed to transmit a driving torque or a rotational driving force, outputted from an engine (not shown) according to a throttle valve opening in response to the depression of an acceleration pedal by a driver, to the rear wheels 10RL and 10RR through a differential gear system, etc. (not shown).

The vehicle in this embodiment has a steering device 16 enabling the steering of front wheels independently of a driver's handling. As shown, front wheels 10FL, 10FR each are steered through tie rods 20L, R with a rack-and-pinion-type power-steering device 16 actuated in response to the rotation of a steering wheel 14 by a driver. The steering device 16 employed here is of a semi-steer-by-wire type, provided with a turning angle varying apparatus 24 as an auxiliary steering apparatus which can vary the steering angle of the front wheels independently of the driver's handling.

The turning angle varying apparatus 24 includes a driving motor 32, having a housing 24A, operationally linking to the steering wheel 14 via an upper steering shaft 22, and a rotor 24B, operationally linking to a pinion shaft 30 via a lower steering shaft 26 and a universal joint 28. The driving motor 32 rotates the lower steering shaft 26 relative to the upper steering shaft 22 under the control of an electronic controller 34 as described later. For controlling the operation of the turning angle varying apparatus 24, a steering angle θ of the steering wheel 14, i.e. the rotational angle θ of the upper steering shaft 22, and a relative angle θre of the lower steering shaft 26 measured from the upper steering shaft 22 (between the housing 24A and rotor 24B) are detected with angular sensors 50 and 52, respectively.

The power steering device 16 may be either of hydraulic power steering type or of electric power steering type. However, for reducing a torque reaction transmitted from the apparatus 24 to the steering wheel 14 during the automatic steering control, preferably employed is a rack-coaxial type electric power steering device having a motor and a mechanism for converting the motor's rotational torque into a linear motional force of the rack bar 18.

A braking system 36, generating braking force on each wheel, has a hydraulic circuit 38 comprising a reservoir, an oil pump and various valves, etc.(not shown), wheel-cylinders 40FL, 40FR, 40RL and 40RR, equipped on the respective wheels, and a master cylinder 44 actuated in response to the depression of a brake pedal 42 by the driver. In the braking system, a braking pressure in each wheel cylinder, and in turn, the braking force on each wheel, are adjusted through the hydraulic circuit 38 in response to a master cylinder pressure. The braking pressure in each wheel cylinder may also be controlled by the electronic control 34 as described later. For controlling the braking pressures, pressure sensors 62, 64i (i=FL, FR, RL, RR are front left, front right, rear left and rear right, respectively) may be installed for detecting a master cylinder pressure Pm and the pressures Pbi (i=FL, FR, RL, RR) in the wheel-cylinders 40FL-40RR, respectively.

Electronic controller 34, controlling the turning angle varying apparatus 24 and the braking pressures (braking force) of the respective wheels, may be of an ordinary type, including a microcomputer having CPU, ROM, RAM, and input/output port devices, interconnected with the bidirectional common bus, and drive circuits. As seen from FIG. 1, inputted to the controller 34 are signals of: the steering angle θ of the steering wheel 14; the relative angle θre of the lower steering shaft; a longitudinal acceleration Gx, detected with a longitudinal acceleration sensor 54; a yaw rate y, detected with a yaw rate sensor 56; a lateral acceleration Gy, detected with a lateral acceleration sensor 58; pressures Pbi (i=FL, FR, RL, RR) in the wheel-cylinders 40FL-40RR; and wheel velocities Vwi (i=FL, FR, RL, RR) detected with wheel velocity sensors 60i (i=FL, FR, RL, RR).

The controller 34 executes a steering gear ratio control, a stability control and a direction correcting control through the automatic steering control and/or adjusting braking forces or pressures on the respective wheels as described below. In this connection, the parameters in the following expressions are defined as positive in the forward and leftward (counterclockwise in FIG. 1) directions.

Figure 2A:
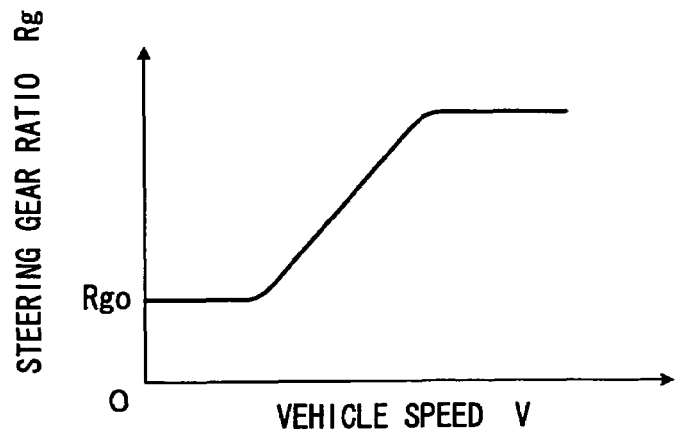
FIG. 2A shows a map of a relation between a vehicle speed V and a steering gear ratio Rg used in a steering gear ratio control.

For the steering gear ratio control, the controller 34 controls the turning angle varying apparatus 24 through the rotation of the motor 32 to vary a steering gear ratio, i.e. the ratio of the steering angle of the front wheels to the rotational angle of the steering wheel 14, providing a predetermined steering characteristic. In operation, first, a steering gear ratio Rg for accomplishing a predetermined steering characteristic is determined using a map shown in FIG. 2A, based upon a vehicle speed V which may be calculated with the wheel velocities Vwi. Then, a target steering angle δst is calculated by:

$$\delta st = \theta / Rg \qquad (1),$$

and the turning angle varying apparatus 24 is actuated to steer the front wheels, adjusting their steering angle to δst. δst may also be a function of a steering angler speed, for improving a transient response of the vehicle motion. It should be noted that the steering gear ratio may be determined in other ways known in the art.

The stability control of suppressing understeering and oversteering tendencies may be executed through adjusting braking forces or pressures on the respective wheels in a conventional manner as follows:

Firstly, in order to estimate a vehicle behavior, Spin value SV and Drift value DV are determined as follows:

$$SV = K1 \cdot \beta + K2 \cdot dVy; \text{ or } = K1 \cdot \beta + K2 \cdot d\beta \qquad (2)$$

$$DS = \gamma t - \gamma; \text{ or } = H \cdot (\gamma t - \gamma) / V \qquad (3),$$

where β is a slip angle of a vehicle; dVy, a side sliding acceleration of the vehicle; dβ, a time differential of β; K1, K2, appropriate weight factors; γt, a target yaw rate estimated from the vehicle speed V and steering angle δ; γ, an actual yaw rate; H, a wheel base. dVy is given from the deviation between a lateral acceleration Gy and a product of yaw rate γ and vehicle speed V: Gy−γ·V. β is obtained by the ratio of side sliding speed to longitudinal speed: Vy/Vx, where Vx=V and Vy is given by integrating dVy. γt is obtained from γt=V·δ/{(1+Kh·V²)·H}×1/(1+Ts), where δ is an actual steering angle, based upon the steering angle θ; Kh, a stability factor; T and s, a time constant and frequency parameter in Laplace transformation. The derivation of expressions (2) and (3) are described elsewhere.

Then, Spin condition value SS and Drift-out condition value DS are defined as:

$$SS = \pm SV \quad (4)$$

$$DS = \pm DV \quad (5)$$

(+: during left turning; −: during right turning. SS, DS is defined as 0 if these are negative.)

SS and DS each indicate degrees of spinning and drifting-out, respectively (The more deteriorated a behavior is, the larger either of the values is.).

Then, using the resultant condition values, target braking force for wheels are calculated as follows:

Fsfo=Fssfo

Figure 2B:
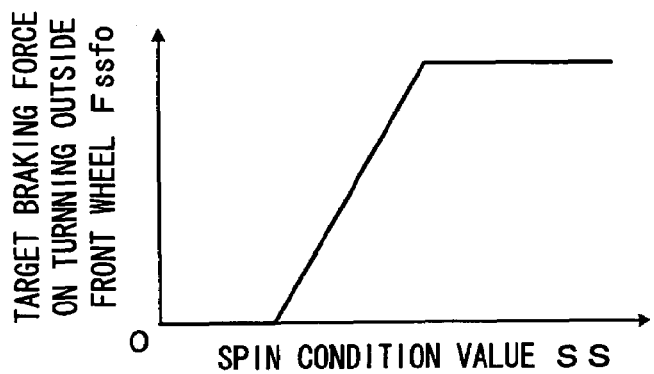
FIGS. 2B and 2C each show maps, used in the stability control, for calculating force components, Fssfo and Fsall, with spinning and drifting-out conditional values, SS and DS.
Figure 2C:
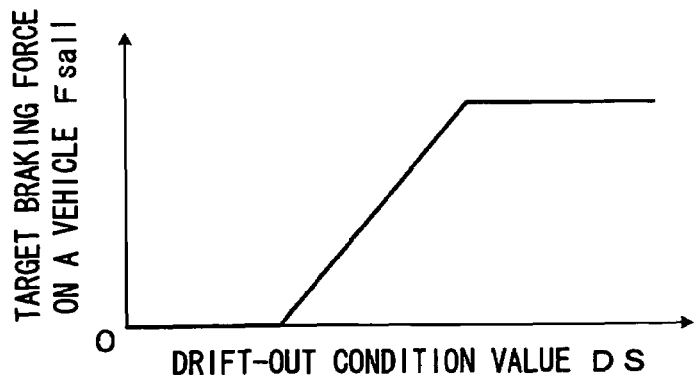

Fsfi=0

$$Fsro = (Fsall - Fssfo) \cdot (1 - Ksri) \quad (6)$$

$$Fsri = (Fsall - Fssfo) \cdot Ksri$$

where Fsj, (j=fo, fi, ro, ri: turning outside and inside front, turning outside and inside rear) are target braking force values for the respective wheels. Fssfo is determined as a function of SS, using a map of FIG. 2B. Fsall is determined as a function of DS, using a map of FIG. 2C. Ksri is an appropriate distribution factor for rear wheels (a positive constant typically exceeding 0.5.). If a calculated value of Fsj is negative, it will be nullified. The above-defined force distribution generates anti-spin or anti-drift-out yaw moment as known in the art (The detailed effects of this force distribution are described elsewhere.).

Finally, the resultant target force values are each converted into target values Pti of braking pressures of the respective wheels with a conversion factor Kb as follows:

[During left turning]

$$Ptfl=Fsfi\cdot Kb;\ Ptfr=Fsfo\cdot Kb;\ Ptrl=Fsri\cdot Kb;\\ Ptrr=Fsro\cdot Kb \quad (7)$$

[During right turning]

$$Ptfl=Fsfo\cdot Kb;\ Ptfr=Fsfi\cdot Kb;\ Ptrl=Fsro\cdot Kb;\\ Ptrr=Fsri\cdot Kb \quad (8)$$

The turning direction can be determined by the sign of the actual yaw rate. If the whole values of Pti are zero, no stability control is executed.

According to the stability control as illustrated above, the deviation of the actual yaw rate γ from the target yaw rate γt will be cancelled. This control, however, does not fully compensate for the deviation of the yaw angle of the vehicle body 12 from the yaw direction intended by the driver owing to the yaw rate deviation. At the end of the stability control, the yaw angle of the vehicle body would be inconsistent with the traveling direction intended by the driver.

The direction correcting control of the inventive device, however, can reduce the tendency of the yaw angle deviation, rendering the direction of the vehicle close to the direction originally intended by the driver. In the embodiment illustrated in FIG. 1, a yaw moment for correcting the traveling direction (yaw angle) of the vehicle body is generated by operating the steering apparatus 16, in which the target steering angle δst is modified based upon an integration value of the yaw rate deviations during the execution of the stability control. In this regard, preferably, after the stability control is ended, the direction correcting yaw moment is kept generated for canceling or reducing a remaining yaw angle deviation, but gradually reduced to zero. Further, considering that the traveling direction intended by the driver can be changed during the execution of the direction correcting control, past running condition or older yaw rate deviations should be less contributive to the direction correcting yaw moment (When the target steering angle δst is changed, past yaw rate deviations could become meaningless in the control.).

In order to accomplish the characteristics of the direction correcting yaw moment as described above, the integration value of the yaw rate deviation, Δγint, may be given by integrating a difference between actual and target yaw rates, Δγ, of a predetermined period (or moment) cyclically, while multiplying an integration value in the last cycle, Δγintf, by a forgetting factor K set to a value between 0 and 1:

$$\Delta\gamma int = \Delta\gamma intf\cdot K + \Delta\gamma\cdot Kg \quad (9),$$

where Kg is a gain for Δγ, selected from 0 and 1, determined as described later. Δγ is given by γt−γ because the direction correcting yaw moment is applied in the direction of reducing the deviation of the actual yaw rate from its target value. The target yaw rate γt may be given by the following expression (as in the stability control):

$$\gamma t = \frac{1}{(1+\tau\cdot s)} \cdot \frac{1}{1+K_h\cdot V^2} \cdot \frac{V}{H} \cdot \delta. \quad (10)$$

In this regard, the target yaw rate γt and the yaw rate difference Δγ may be given from the stability control routine (Δγ is equal to drift value DV).

Then, the modification amount Δδft of the target steering angle of the front wheels may be determined by using the resultant integration value Δγint as follows:

$$\Delta\delta ft = \Delta\gamma int\cdot Ksf \quad (11)$$

where Ksf is a conversion factor.

In the expression (9), Δγ is set to zero under a normal condition and after the stability control is ended. Thus, the integration of the second term in the expression (9) is executed only when the stability control is executed. Further, by cyclically multiplying the previously calculated integration value Δγintf by the factor K during repeating the calculation of the expression (9), older yaw rate deviations are rendered less contributive to the target steering angle, and in turn, the direction correcting yaw moment. Accordingly, after the stability control is ended, the value of Δγint will be gradually reduced. In this connection, the forgetting factor K may be constant or reducing with time or during repeating cycles.

The gain Kg is set to zero when the understeering of the vehicle reaches to a rather high degree. When the tire forces of the front wheels are almost saturated under an understeering condition, the increase in cornering force of the front wheels would induce the slippage of the tires of the front wheels. Thus, under a rather highly advanced understeering condition, no direction correcting yaw moment is generated for preventing the front wheels from slipping. Under an oversteering condition, Kg is set to 1.

Figure 3:
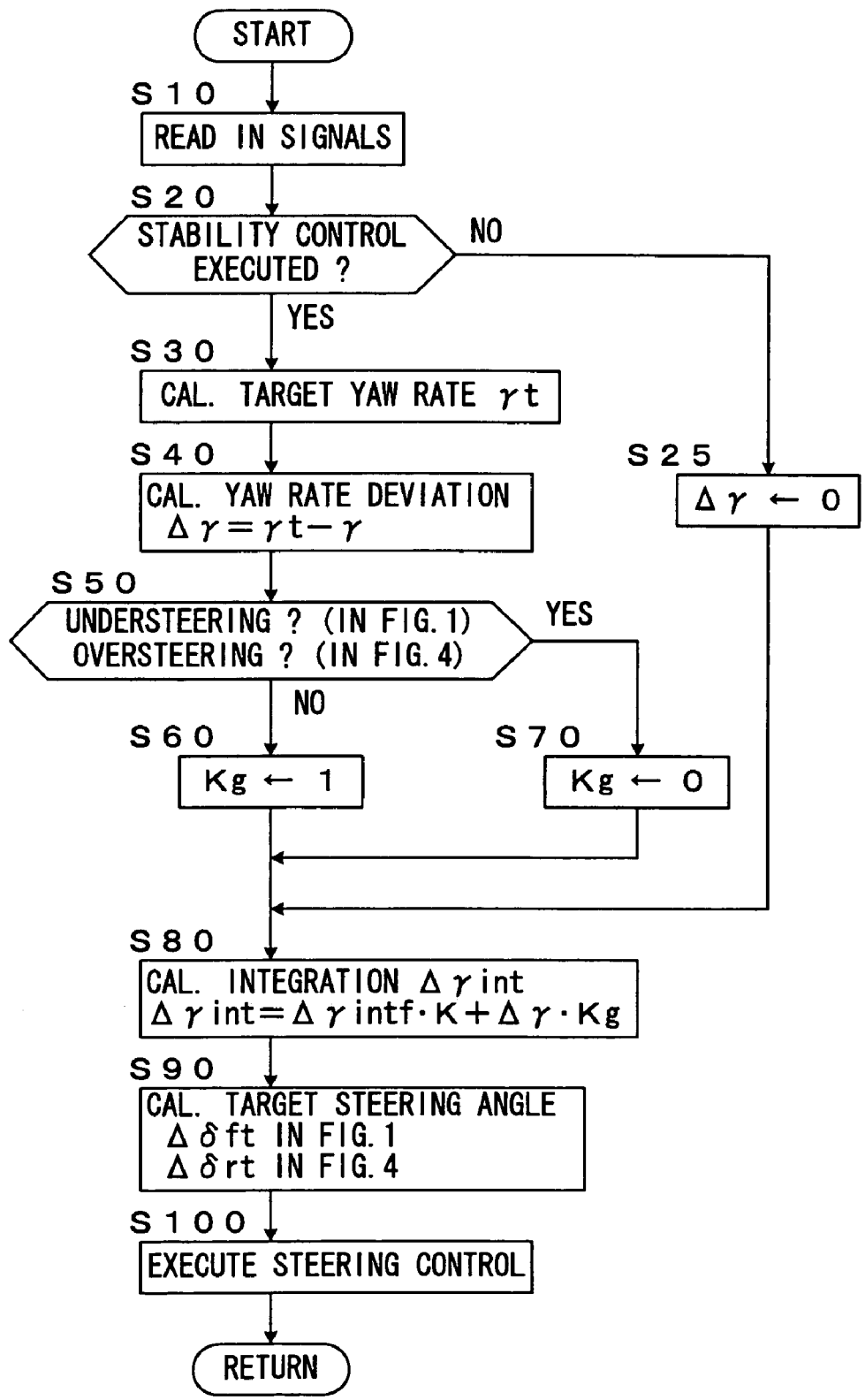
FIG. 3 is a flowchart of a direction correcting control routine executed in the first and second preferred embodiments in the vehicles in FIGS. 1 and 4 according to the present invention.

FIG. 3 shows an exemplary flowchart of the operation of the direction correcting control for generating the direction correcting yaw moment as described above. This control routine may be started by a closure of an ignition switch (not shown in FIG. 1) and repeated at cycle time such as milliseconds during the operation of the vehicle.

In this routine, as usual, signals as described above are first read-in (step 10) and it is judged if the stability control is being executed (step 20). When the stability control is not executed, the integration value $\Delta\gamma\text{int}$ will be calculated as zero since $\Delta\gamma\text{intf}$ and $\Delta\gamma$ are zero in expression (9) (step 80).

On the other hand, when the stability control is started, the difference $\Delta\gamma$ between an actual yaw rate $\gamma$ and an target yaw rate $\gamma t$ is acquired (steps 30, 40) and it is judged if the vehicle falls into an rather highly advanced understeering condition (step 50). This judgment may be done by judging if $\text{sign}\gamma \cdot \Delta\gamma$ exceeds a positive reference value $\Delta\gamma p$, where $\text{sign}\gamma$ is the sign of $\gamma$. If this answer is yes, Kg is set to zero (step 70), and then no integration of the yaw rate deviation is conducted so that no direction correcting yaw moment is generated. Otherwise, Kg is set to 1 (step 60). In this connection, the generation of the direction correcting yaw moment may be inhibited whenever the vehicle is understeered ($\Delta\gamma p$ will be set to a small value.).

Then, the integration value $\Delta\gamma\text{int}$ and the modification value for the steering angle $\Delta\delta\text{ft}$ are calculated by expressions (9) and (11) in steps 80, 90, respectively, and the steering angle is controlled to be $\delta\text{st}+\Delta\delta\text{ft}$, where $\delta\text{st}$ is given by expression (1). It should be noted that both stabilizing yaw moment and direction correcting yaw moment are generated during execution of the stability control under oversteering conditions.

After the stability control is ended, although the integration process through steps 30-70 is bypassed, the integration value $\Delta\gamma\text{int}$ is calculated as $\Delta\gamma\text{intf}\cdot K$ so that the direction correcting yaw moment can be generated to reduce a yaw angle deviation remaining after the end of the stability control, if any. $\Delta\gamma\text{int}$, i.e. the direction correcting yaw moment will gradually reduce to zero during repeating the cycles through the repetitive multiplications of the forgetting factor K.

Figure 4:
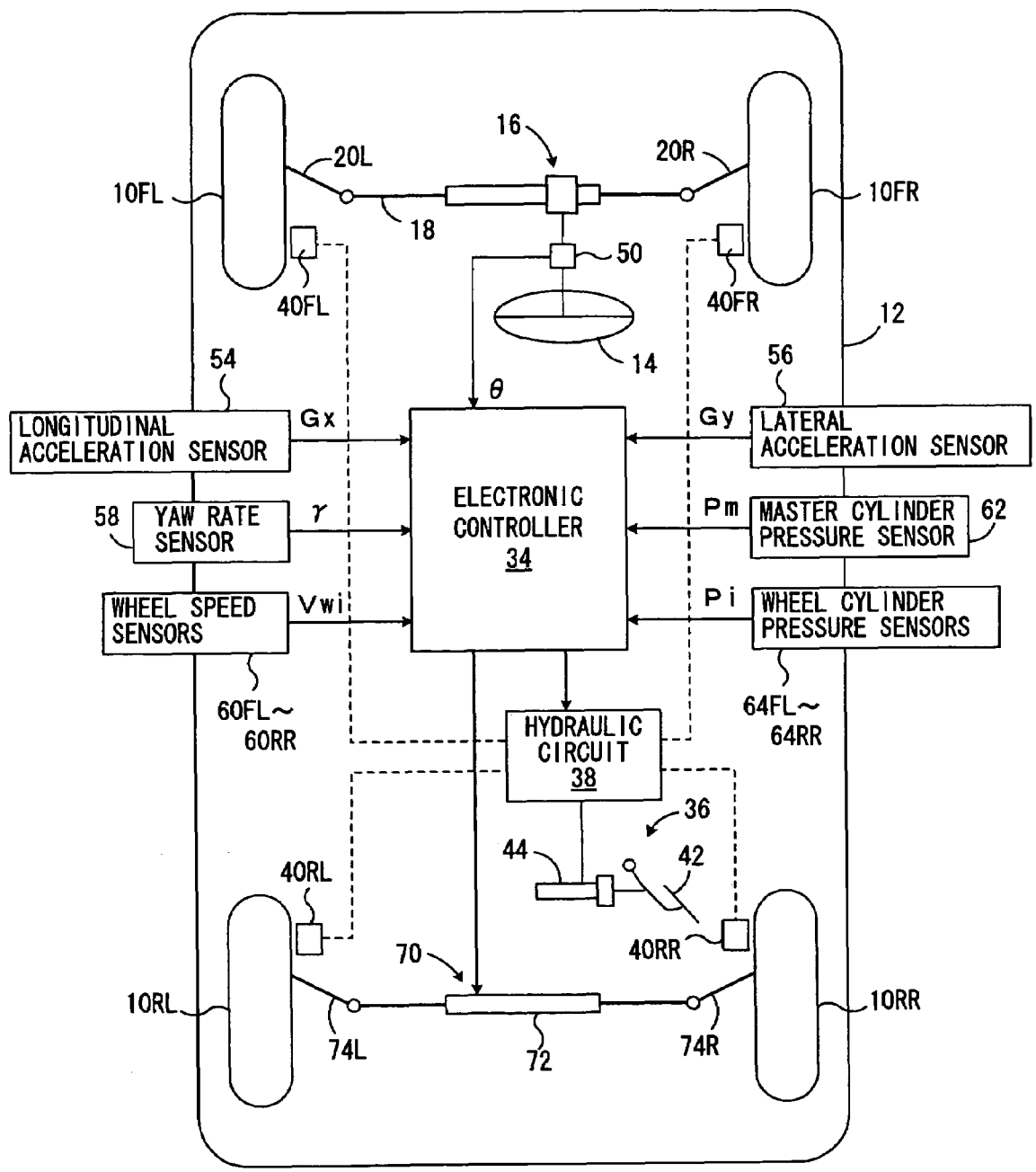
FIG. 4 is a diagrammatical view of a four wheeled, rear drive vehicle equipped with a steering apparatus for the rear wheels and a second embodiment of a vehicle running control device according to the present invention.

FIG. 4 diagrammatically shows a four-wheeled, rear drive vehicle having a second preferred embodiment of a vehicle running control device according to the present invention. In this vehicle, a steering device 70 for the pair of rear wheels 10RL, RR is provided, where the rear wheels are steered with a hydraulic or electric powered steering apparatus 72 via tie rods 74L, R. The steering angle of the rear wheels are controlled by the controller 34. As for the front wheels, their steering angle may be controlled solely by the handling of the driver (The steering device 16 enabling the steering of front wheels independently of a driver's handling as shown in FIG. 1 may be installed.).

In operation, a stability control (and a steering gear ratio control) may be conducted as in the first embodiment described above. However, a direction correction control will be conducted by controlling the steering angle of the rear wheels; namely, a direction correcting yaw moment is generated by the rear wheels. In the direction correction control, the integration process of yaw rate deviations may be identical to that in the first embodiment, except that the gain factor Kg in expression (9) is set to 0 when the vehicle is highly oversteered. This is because the tire forces of the rear wheels are almost saturated under a rather highly advanced oversteering condition. On the other hand, when the vehicle is understeered, Kg is set to 1 in expression (9). In step 50 in the flowchart of FIG. 3, it is judged if the vehicle falls into an oversteered condition, for example by judging if $\text{sign}\gamma \cdot \Delta\gamma$ is lower than a predetermined negative reference value $\Delta\gamma n$. In this connection, the generation of the direction correcting yaw moment may be inhibited whenever the vehicle is oversteered ($\Delta\gamma n$ will be set to a small value.).

The target steering angle of the rear wheels $\Delta\delta rt$ is set to:

$$\Delta\delta rt = \Delta\gamma int \cdot Ksr \qquad (11)$$

where Ksr is a conversion factor. It should be noted that the target steering angle of the rear wheels are controlled solely by $\Delta\delta rt$.

By the way, the direction correction control may be conducted through the braking force distribution control by controlling braking pressures of the individual wheels together with the stability control. In this case, no steering apparatus for enabling the steering of wheels independently of a driver's handling is required so that the cost for manufacturing the vehicle can be saved. In operation, the braking pressures on the wheels for generating a direction correcting yaw moment are modified by an amount determined based upon an integration value of the yaw rate deviations. However, if a tire force of a wheel for generating a direction correcting yaw moment is saturated, i.e. if the vehicle is rather highly understeered or oversteered, no direction correcting yaw moment is generated.

Figure 5:
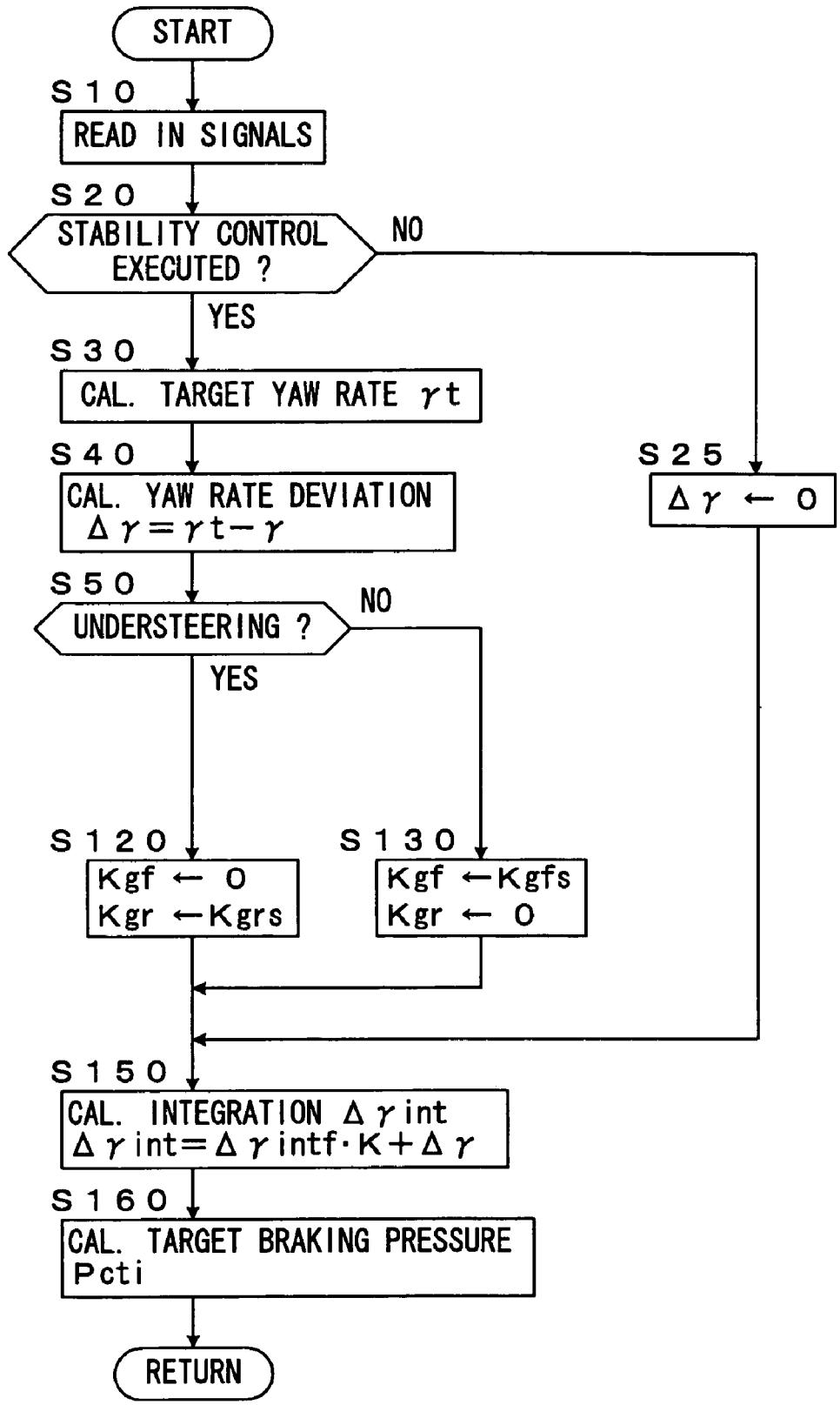
FIG. 5 is a flowchart of a direction correcting control routine executed through braking force control (the third embodiment) according to the present invention.

FIG. 5 shows an exemplary flowchart of the operation of the direction correcting control through the braking force control, which is almost identical to the flowchart in FIG. 3. In this flowchart, the integration of the yaw rate deviations is conducted in step 150 by:

$$\Delta\gamma int = \Delta\gamma intf \cdot K + \Delta\gamma \qquad (12).$$

Thus, in this expression, the gain factor Kg in FIG. 3 is not used. When the vehicle behavior is deteriorated, conversion factors Kgf, Kgr from the integration value unit to the braking pressure unit for the front and rear wheels, respectively, are nullified for wheels whose tire force is saturated.

In operation, as in the flowchart in FIG. 3, signals as described above are read-in (step 10) and it is judged if the stability control is being executed (step 20). When the stability control is not executed, the integration value $\Delta\gamma int$ is calculated as zero since $\Delta\gamma intf$ and $\Delta\gamma$ are zero (step 150).

On the other hand, when the stability control is executed, the integration process is executed. After the acquisition of the yaw rate deviation $\Delta\gamma$, it is judged if the vehicle is understeered (step 50). If the vehicle is understeered, then conversion factors Kgf, Kgr for the front and rear wheels are set to 0 and Kgrs (a predetermined value), respectively (step 120). If not, since it is considered that the vehicle is oversteered because the vehicle behavior is deteriorated in either direction under the stability control, conversion factors Kgf, Kgr are set to Kgfs (a predetermined value) and 0, respectively (step 130). Then, the integration $\Delta\gamma int$ is calculated as in expression (12) in step 150.

The components Pcti (i=fl, fr, rl, rr) of the target braking pressures for generating the direction correcting yaw moment are determined as follows:

[During left turning]

$$Pctfl=0; Pctfr=|\Delta\gamma int|\cdot Kgf; Pctrl=\Delta\gamma int \cdot Kgr; Pctrr=0 \qquad (13)$$

[During right turning]

$$Ptfl=\Delta\gamma int \cdot Kgf; Ptfr=0; Ptrl=0; Ptrr=|\Delta\gamma int|\cdot Kgr \qquad (14).$$

Namely, the braking pressures of the respective wheels are modified so as to increase the counter yaw moment.

Accordingly, during the execution of the stability control, the total Namely, the braking pressures of the respective wheels are modified so as to increase the counter yaw moment.

Accordingly, during the execution of the stability control, the total target braking pressures are as follows:

[During left turning]

$Ptfl=Fsfi\cdot Kb;\ Ptfr=Fsfo\cdot Kb+|\Delta\gamma int|\cdot Kgf,$ $Ptrl=Fsri\cdot Kb+\Delta\gamma int\cdot Kgr;\ Ptrr=Fsro\cdot Kb$ (15)

[During right turning]

$Ptfl=Fsfo\cdot Kb+\Delta\gamma int\cdot Kgf;\ Ptfr=Fsfi\cdot Kb;$ $Ptrl=Fsro\cdot Kb;\ Ptrr=Fsri\cdot Kb+|\Delta\gamma int|\cdot Kgr$ (16).

After the stability control is ended, the total target braking pressures will be as in expression (13) or (14).

Although the present invention has been described in detail with respect to preferred embodiments thereof and some partial modifications thereof, it will be apparent for those skilled in the art that other various modifications are possible with respect to the shown embodiments within the scope of the present invention.

For instance, in the above-mentioned embodiments as shown in FIGS. 3 and 5, it should be noted that the direction correcting control may be ended together with the stability control. The direction correcting control has an effect of steering the vehicle independently executed by the handling of the driver. So, whether or not the direction correcting control is to be continued after the stability control is ended may be selected, depending upon the driver's preference.

Further, it should be readily understood by one of ordinary skill in the art that, in the embodiments in FIGS. 1 and 4, the stability control and the direction correcting control may be conducted with the steering apparatus and braking apparatus, respectively.

What is claimed is:

1. A device for controlling a running condition of a vehicle having a vehicle body and a first yaw moment generating apparatus that generates a yaw moment thereon, the device comprising: a portion that judges a running condition of the vehicle; and a portion that executes a running stability control of the vehicle through generating a stabilizing yaw moment to the vehicle by operating the first yaw moment generating apparatus when the running condition is judged to be unstable; a second yaw moment generating apparatus that generates a yaw moment on the vehicle body and a detector that detects an actual yaw rate of the vehicle; the device further comprising: a portion that calculates a target yaw rate for the vehicle based upon a driver's operation and a yaw rate deviation integration value calculating portion that calculates an integration value of yaw rate deviations between the actual and target yaw rates; the yaw rate deviation integration value calculating portion calculating a yaw rate deviation between the actual and target yaw rates every predetermined period and calculating the integration value by integrating a current yaw rate deviation to an integration value of yaw rate deviations obtained in a preceding period while reducing weights of the yaw rate deviations of preceding period relative to a weight of the yaw rate deviation at a present period; and a portion that executes a control of correcting a yaw direction of the vehicle body through generating a direction correcting yaw moment based upon the integration value of the deviations between the yaw rates by operating the second yaw moment generating apparatus; wherein the integration value is given by summing the yaw rate deviation at the present period and a value obtained by multiplying an intergration value calculated in periods before the present period by a forgetting factor.

2. A device according to claim 1, wherein the yaw rate integration value calculating portion integrates the yaw rate deviations when the running stability control is executed.

3. A device according to claim 1, wherein the weights of the yaw rate deviation of preceding periods are rendered smaller.

4. A device according to claim 1, wherein the first and second yaw moment generating apparatus each are selected from an apparatus that generates a yaw moment by controlling braking and driving forces on individual wheels and an apparatus that generates a yaw moment by controlling a steering angle of wheels.

5. A device according to claim 1, wherein the second yaw moment generating apparatus is an apparatus that generates a yaw moment by controlling a steering angle of front wheels of the vehicle, and the direction correcting control executing portion suppresses an increase in a control amount of the second yaw moment generating apparatus when the vehicle is fallen into an understeering condition.

6. A device according to claim 1, wherein the second yaw moment generating apparatus is an apparatus that generates a yaw moment by controlling a steering angle of rear wheels of the vehicle, and the direction correcting control executing portion suppresses an increase in a control amount of the second yaw moment generating apparatus when the vehicle is fallen into an oversteering condition.

7. A device according to claim 1, wherein the first and second yaw moment generating apparatuses are an identical apparatus, which generates a sum of the stabilizing yaw moment and direction correcting yaw moment.

8. A device for controlling a running condition of a vehicle having a vehicle body and a first yaw moment generating apparatus that generates a yaw moment thereon, the device comprising: a portion that judges a running condition of the vehicle; and a portion that executes a running stability control of the vehicle through generating a stabilizing yaw moment to the vehicle by operating the first yaw moment generating apparatus when the running condition is judged to be unstable; a second yaw moment generating apparatus that generates a yaw moment on the vehicle body and a detector that detects an actual yaw rate of the vehicle; the device further comprising: a portion that calculates a target yaw rate for the vehicle based upon a driver's operation and a yaw rate deviation integration value calculating portion that calculates an integration value of yaw rate deviations between the actual and target yaw rates; the yaw rate deviation integration value calculating portion iteratively calculating a yaw rate deviation between the actual and target yaw rates and calculating the integration value by integrating a current yaw rate deviation to an integration value of yaw rate deviations obtained in a preceding period while reducing weights of the yaw rate deviations of preceding periods relative to a weight of the yaw rate deviation at a present iteration; and a portion that executes a control of correcting a yaw direction of the vehicle body through generating a direction correcting yaw moment based upon the integration value of the deviations between the yaw rates by operating the second yaw moment generating apparatus; wherein the integration value is given by summing the yaw rate deviation at the present period and a value obtained by multiplying an integration value calculated in periods before the present period by a forgetting factor.

* * * * *